No. 760,683. PATENTED MAY 24, 1904.
J. COUDON.
DECOY DUCK.
APPLICATION FILED SEPT. 9, 1903.
NO MODEL.
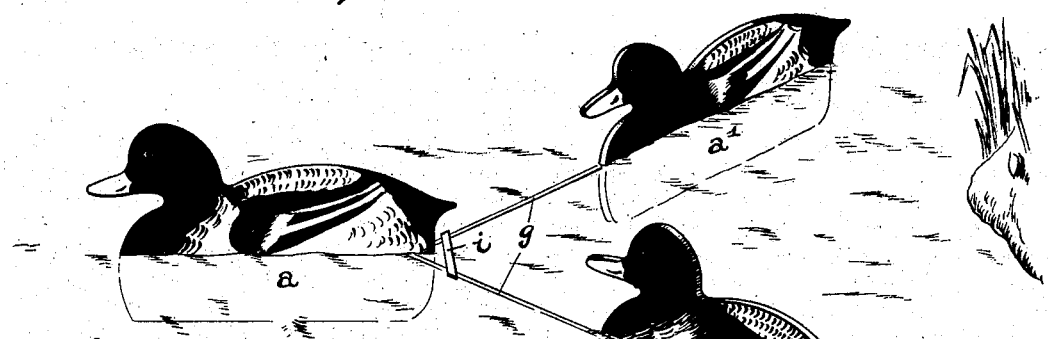
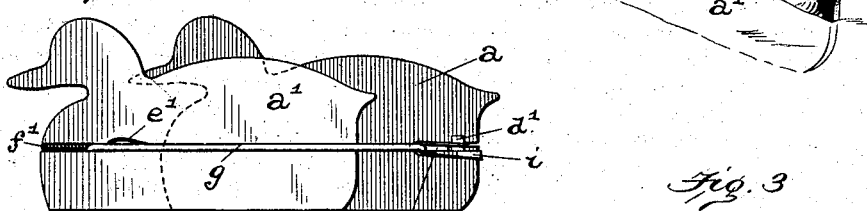
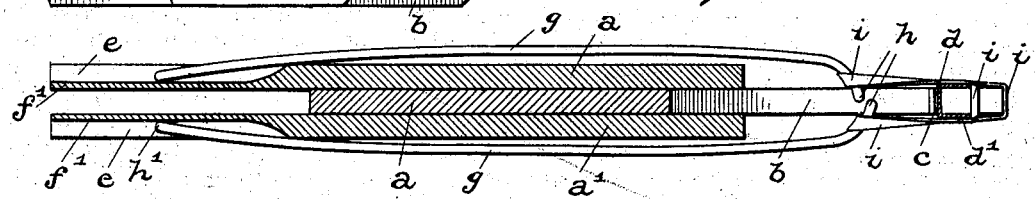
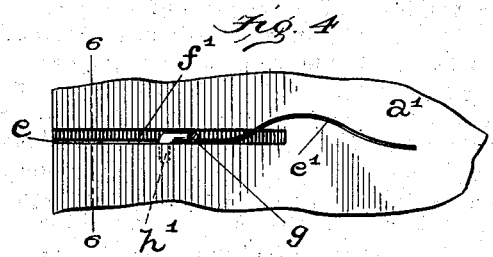
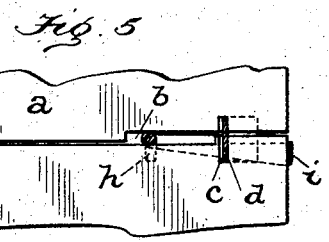
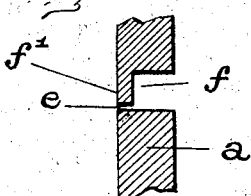
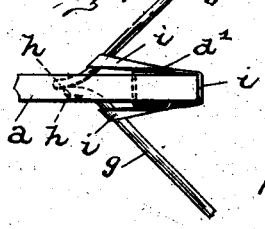
Witnesses
Edwin L. Bradford
Alfred G. Goodrich
Inventor
Joseph Coudon
By
Mann & G.
Attorneys No. 760,683. Patented May 24, 1904.

UNITED STATES PATENT OFFICE.

JOSEPH COUDON, OF AIKIN, MARYLAND.

DECOY-DUCK.

SPECIFICATION forming part of Letters Patent No. 760,683, dated May 24, 1904.

Application filed September 9, 1903. Serial No. 172,433. (No model.)

*To all whom it may concern:*

Be it known that I, JOSEPH COUDON, a citizen of the United States, residing at Aikin, in the county of Cecil and State of Maryland, have invented certain new and useful Improvements in Decoy-Ducks, of which the following is a specification.

This invention relates to improvements in decoy-ducks, and has for its object to provide an improved device of this character which is capable of being readily folded up into a comparatively small space for packing or transportation and which may hold several decoys which will float in the water in positions varying with respect to each other.

The present invention is an improvement on the device shown in Letters Patent No. 694,732, granted to me March 4, 1902; and it consists in certain constructions, arrangements, and combinations of the parts hereinafter fully described and claimed, reference being had to the accompanying drawings, in which—

Figure 1 is a perspective view of the decoy device with the decoys spread out as they appear in practical use. Fig. 2 is a side elevation of the several decoys folded against each other for convenience in packing and transportation. Fig. 3 is an enlarged longitudinal sectional view of the folded decoys. Fig. 4 is a fragmentary side elevation of the front portion of a decoy-duck and shows the horizontal slot. Fig. 5 is a similar view of the rear end of the duck. Fig. 6 is a vertical section on the line 6 6 of Fig. 4, and Fig. 7 is a plan view of the rear end of one of the decoy-ducks.

Referring to the drawings, the letter $a$ designates the main decoy, and $a'$ the pivoted decoys, which are pivotally connected with respect to the main decoy. In the present instance each one of these decoys is formed from a comparatively narrow strip of wood or other suitable material shaped and painted to represent a duck in side view.

The two decoys $a'$ are alike in construction; but the decoy $a$ differs from the others, as will now be described.

The decoy $a$ is provided in the present instance at its rear with a horizontally-extending slot $b$, which has position about midway between the top and bottom surfaces of the decoy. This decoy $a$ is also provided with a slot $c$, which extends at right angles to the slot $b$ and at each side of the latter, and a plate $d$ extends through said vertical slot $c$ and has its two ends $d'$ bent at right angles or in a direction parallel with the sides of the decoy. This plate $d$ is provided for the purpose of strengthening the decoy at said slotted end.

The decoys $a'$ are each provided at their front ends with horizontal slots $e$, which have position about midway between the top and bottom surfaces. The rear portions $e'$ of each of these slots $e$ are curved upwardly and then downwardly, as clearly illustrated in Fig. 4, for a purpose to be presently described. Above the slots $e$ each decoy is provided with a groove $f$, which also extends in a horizontal direction from the front toward the rear of the decoy, (see Figs. 4 and 6,) and these grooves extend only partly through the decoy, and thereby form a vertical wall $f'$ at one side of the groove $e$. As seen in Figs. 2 and 3, when the decoys are folded together the vertical wall $f'$ of each of the decoys $a'$ will be on the inner sides confronting each other or that side which adjoins the decoy $a$.

A link $g$ is provided to pivotally connect each of the decoys $a'$ with the decoy $a$, and these links are each provided with hooks $h$ and $h'$, one at each end. In the present instance the hooks are downwardly-projecting; but it is obvious that the same may be turned in the opposite direction. The hooks $h$ at one end of the links $g$ are inserted into the slot $b$ at the rear of the decoy $a$, and said hooks take down into the said decoy near the plate $d$. The hooks $h'$ on the opposite ends of the links $g$ take into the slots $b$ at the side of the vertical walls $f'$ and are inserted into the decoy below the grooves $e$. In inserting these hooks and securing them in position within the grooves $e$ and $b$ it is necessary to spring the thin wood or other material of which the decoy is made, and in order to prevent splitting in this operation the groove $e'$ is provided. An elastic band $i$ serves to hold the links $g$ spread apart.

In unfolding or spreading the decoys apart, as seen in Fig. 1, the decoys $a'$ and links $g$ are swung backward to the rear of the decoy $a$. By turning on the hooks $h$ the two decoys $a'$ are then each given a half-turn, independently turning on the hooks $h'$, so that the vertical walls $f'$ will act as a stop for the links $g$, and thereby prevent the decoys $a'$ from turning on the hooks $h'$ farther than half a turn. The elastic band then holds or retains the links in the spread condition.

By reference to Figs. 3 and 7 of the drawings it will be seen that the links $g$ near the pivot-hooks $h'$ are curved inwardly toward said pivots and that when the decoys are spaced apart, as in Fig. 1, the said curved portions of the two links will contact with each other, as shown in broken lines in Fig. 7, and thus form a stop which prevents the decoys $a'$ from swinging close to each other or assuming a position parallel with the main decoy $a$.

Having thus fully described my invention, what I claim as new, and desire to secure by Letters Patent, is—

1. A floatable decoy device comprising a main decoy; a link pivoted at each side of said main decoy so as to swing; and a decoy freely pivoted at the outer end of each of said links and each decoy being capable of freely turning on its pivot independently of any movement of the link to which it is attached.

2. A floatable decoy device, comprising a plurality of decoys each provided with a slot; a plurality of links all pivotally secured at one end in the slot of one decoy and the other end of each of said links being pivotally secured in the slot of a different decoy.

3. A floatable decoy device, comprising a plurality of decoys one of which is provided with a slot at one end and the others each having a slot in the opposite end; a separate and independent link pivoted in each slot of all the decoys whose slots are at the same end and the other end of each of said links being pivotally secured in the slot of the other decoy.

4. A floatable decoy device, comprising three decoys, one of which is provided with a horizontal slot at its rear and the other two decoys each having a horizontal slot at its front; two links each of which is pivotally connected in the rear slot of one decoy and the other end of each two links being pivoted in the front slot of one of the two decoys and said front slots each having a stop against which the links take.

5. A floatable decoy device, comprising three decoys one of which is provided with a horizontally-extending rear slot and the other two decoys each having a horizontally-extending front slot; a vertically-extending wall in each of the front slots of said two decoys and forming a stop, and two links each of which has one end pivotally secured in the rear slot of the one decoy and the other end of each link being pivotally secured in the front slots of the other two decoys and at the side of said vertical wall.

6. A floatable decoy device, comprising three decoys, each of which is provided with a horizontally-extending slot; two links each having one end pivoted in the slot of one decoy and the other end of each link being pivoted in the slot of one of the other two decoys; a vertical slot in the decoy to which the two links are secured, said vertical slot extending at an angle to the horizontal slot of said decoy, and a plate extending through the said vertical slot and clamping the sides of said decoy.

In testimony whereof I affix my signature in the presence of two witnesses.

JOSEPH COUDON.

Witnesses:
 CHARLES B. MANN, Jr.,
 CHAS. B. MANN.